(12) United States Patent
Han et al.

(10) Patent No.: US 11,294,569 B2
(45) Date of Patent: *Apr. 5, 2022

(54) METHOD AND APPARATUS FOR MAINTAINING RELIABILITY OF A RAID

(71) Applicant: EMC IP Holding Company LLC, Hopkinton, MA (US)

(72) Inventors: Geng Han, Beijing (CN); Jian Gao, Beijing (CN); Jibing Dong, Beijing (CN); Hongpo Gao, Beijing (CN); Shaoqin Gong, Beijing (CN)

(73) Assignee: EMC IP HOLDING COMPANY, LLC, Hopkinton, MA (US)

( * ) Notice: Subject to any disclaimer, the term of this patent is extended or adjusted under 35 U.S.C. 154(b) by 120 days.

This patent is subject to a terminal disclaimer.

(21) Appl. No.: 16/748,175

(22) Filed: Jan. 21, 2020

(65) Prior Publication Data

US 2020/0159416 A1    May 21, 2020

Related U.S. Application Data

(63) Continuation of application No. 15/440,034, filed on Feb. 23, 2017, now Pat. No. 10,540,091.

(30) Foreign Application Priority Data

Feb. 25, 2016   (CN) .......................... 201610103823.6

(51) Int. Cl.
  *G06F 11/10*   (2006.01)
  *G06F 3/06*    (2006.01)
  *G06F 11/00*   (2006.01)

(52) U.S. Cl.
  CPC .......... *G06F 3/0607* (2013.01); *G06F 3/0619* (2013.01); *G06F 3/0632* (2013.01);
  (Continued)

(58) Field of Classification Search
  CPC .... G06F 3/0607; G06F 3/0619; G06F 3/0632; G06F 3/0689; G06F 11/0008; G06F 11/1076; G06F 11/1088; G06F 11/1092
  See application file for complete search history.

(56) References Cited

U.S. PATENT DOCUMENTS 6,516,425 B1 *  2/2003  Belhadj ............... G06F 11/1092
                                                714/15
8,601,313 B1   12/2013  Horn
(Continued)

FOREIGN PATENT DOCUMENTS

| CN | 103544202 A | 1/2014 |
| CN | 104111880 A | 10/2014 |
| CN | 105353991 A | 2/2016 |

OTHER PUBLICATIONS

First Chinese Office Action issued in Chinese Application No. 2016101038236 dated Sep. 26, 2019.
(Continued)

*Primary Examiner* — Yolanda L Wilson
(74) *Attorney, Agent, or Firm* — Brian J. Colandreo; Mark H. Whittenberger; Holland & Knight LLP

(57) ABSTRACT a method and an apparatus for maintaining reliability of a mapped redundant array of independent disks. The method comprises: determining a first data loss probability, the first data loss probability indicating reliability of a traditional redundant array of independent disks; determining a second data loss probability, the second data loss probability indicating reliability of the mapped redundant array of independent disks; and determining, based on the first and second data loss probabilities, a condition for maintaining the reliability of the mapped redundant array of independent disks. Compared with the prior art, embodiments of the present disclosure can effectively predict the reliability of a mapped RAID through comparison with a traditional RAID, (Continued)

so as to be capable of determining a reliability relationship between the traditional RAID and the mapped RAID. In this way, the reliability of the traditional RAID will not be degraded when being expanded into the mapped RAID.

14 Claims, 8 Drawing Sheets

(52) U.S. Cl.
CPC ......... *G06F 3/0689* (2013.01); *G06F 11/008* (2013.01); *G06F 11/1076* (2013.01); *G06F 11/1092* (2013.01)

(56) References Cited

U.S. PATENT DOCUMENTS

| | | | | |
|---|---|---|---|---|
| 8,880,801 | B1* | 11/2014 | Robins | G06F 11/1092 711/114 |
| 9,229,796 | B1 | 1/2016 | Ma et al. | |
| 9,244,790 | B1 | 1/2016 | Ma | |
| 11,042,452 | B1* | 6/2021 | McNutt | G06F 11/1466 |
| 2002/0066050 | A1 | 5/2002 | Lerman et al. | |
| 2008/0010499 | A1 | 1/2008 | Vingralek | |
| 2014/0019813 | A1* | 1/2014 | McLean | G06F 11/008 714/47.3 |
| 2014/0215147 | A1 | 7/2014 | Pan | |
| 2015/0046756 | A1 | 2/2015 | Sreekumaran et al. | |
| 2016/0292035 | A1* | 10/2016 | Alcorn | G06F 11/0757 |
| 2017/0024295 | A1* | 1/2017 | Klughart | G06F 11/2069 |
| 2017/0364271 | A1* | 12/2017 | Han | G06F 11/1076 |
| 2018/0004604 | A1* | 1/2018 | Khadiwala | G06F 16/10 |
| 2020/0042388 | A1* | 2/2020 | Roberts | G06F 11/1088 |
| 2020/0371855 | A1* | 11/2020 | Rashidinejad | G06F 11/079 |

OTHER PUBLICATIONS

Non-Final Office Action issued in related U.S. Appl. No. 15/440,034 dated Sep. 7, 2018.
Final Office Action issued in related U.S. Appl. No. 15/440,034 dated Dec. 31, 2018.
Non-Final Office Action issued in related U.S. Appl. No. 15/440,034 dated Apr. 18, 2019.
Notice of Allowance issued in related U.S. Appl. No. 15/440,034 dated Sep. 11, 2019.

* cited by examiner

METHOD AND APPARATUS FOR MAINTAINING RELIABILITY OF A RAID

RELATED APPLICATIONS

This application is a continuation of U.S. patent application Ser. No. 15/440,034; filed Feb. 23, 2017, which claims priority of Chinese Patent Application Number CN201610103823.6, filed on 25 Feb. 2016, the contents of which are herein incorporated by reference in their entireties.

FIELD

Embodiments of the present disclosure generally relate to the field of data storage, and more specifically, to a method and an apparatus for maintaining reliability of a mapped redundant array of independent disks (mapped RAID).

BACKGROUND

A redundant array of independent disks (RAID) is a data storage virtualization technology, which combines a plurality of physical disk drives into a single logic unit for the purposes of data redundancy and/or performance improvement. Data may be distributed across a plurality of disks in one (e.g., RAID 5) of several ways (also referred to as RAID levels, including RAID 0, RAID 1, . . . , RAID 5, etc.), depending on the required level of redundancy and performance. Taking RAID 5 as an example, it may consist of block-level stripes with distributed parity. Upon failure of a single drive, subsequent reads can be calculated from the distributed parity such that no data is lost. Meanwhile, a hot spare disk will be selected to replace the failed disk and all data on the failed disk will be rebuilt and written to the hot spare disk. However, with emergence of new technologies (e.g., shingled media disks), disk capacity increases year by year, and the rebuilding time also increases accordingly. If the rebuilding time of the disk cannot be reduced, an increased risk of double disk failure will occur, which will lead to data loss. The rebuilding time of RAID 5 is subject to a write bandwidth of the hot spare disk, which has become a bottleneck for traditional RAID technologies.

The problems above may be solved by introducing mapped RAID technology. The mapped RAID may consist of more disks than the traditional RAID 5. While creating a RAID stripe, several disk extends may be randomly selected from a plurality of disks, such that data and parity information will be finally distributed among all of the disks. Upon failure of one disk, each disk extent on the failed disk may be replaced by a disk extent randomly selected from another disk. Therefore, with this technology, all of the disks will be involved in the rebuilding process. Because there is no single hot spare disk and the writing of a plurality of disk extents can be executed in parallel, the entire rebuilding time will be reduced.

However, the approach of extending a traditional RAID to a mapped RAID by increasing the number of disks possibly affects its reliability (e.g., increasing the probability of data loss). In the prior art (e.g., as disclosed in IEEE Transactions on Computers, 1996, 45(3): 367-373, Analytic Modeling of Clustered RAID with Mapping Based on Nearly Random Permutation), an approach of accurate data modeling may be employed to predict various actual performances of the mapped RAID. However, it could be rather complicated to build such an arithmetic model, and it possibly cannot fully and truly reflect a specific construction of the mapped RAID. Therefore, an efficient solution is desired in the art to determine a reliability relationship between a traditional RAID and a mapped RAID so as to ensure that compared with the traditional RAID, the reliability of the mapped RAID will not be degraded.

SUMMARY

Embodiments of the present disclosure intend to provide a method and an apparatus for maintaining reliability of a mapped redundant array of independent disks so as to solve the problems above.

According to an aspect of the present disclosure, there is provided a method of maintaining reliability of a mapped redundant array of independent disks, comprising: determining a first data loss probability, the first data loss probability indicating reliability of a traditional redundant array of independent disks; determining a second data loss probability, the second data loss probability indicating reliability of the mapped redundant array of independent disks; and determining, based on the first and second data loss probabilities, a condition for maintaining the reliability of the mapped redundant array of independent disks.

In some embodiments, determining the first data loss probability comprises: determining a first relationship between a first probability for a single disk failure at any time and the number of disks in the traditional redundant array of independent disks; determining a second relationship between a second probability for a single disk failure within a predetermined time interval and a length of the predetermined time interval; and determining the first data loss probability based on the first and second relationships.

In some embodiments, the first relationship indicates that the first probability for a single disk failure at any time is substantially proportional to the number of disks in the traditional redundant array of independent disks.

In some embodiments, the second relationship indicates that the second probability for a single disk failure within the predetermined time interval is substantially proportional to the length of the predetermined time interval.

In some embodiments, determining the second data loss probability comprises: determining the second data loss probability based on the first and second relationships.

In some embodiments, determining the condition for maintaining the reliability of the mapped redundant array of independent disks comprises: determining a third relationship between a first time for rebuilding the traditional redundant array of independent disks and a second time for rebuilding the mapped redundant array of independent disks, such that the second data loss probability does not exceed the first data loss probability.

In some embodiments, determining the condition for maintaining the reliability of the mapped redundant array of independent disks further comprises: determining, based on the third relationship, a desired rate for rebuilding the mapped redundant array of independent disks.

In some embodiments, determining the condition for maintaining the reliability of the mapped redundant array of independent disks further comprises: determining, based on the desired rate and an actual rate for rebuilding the mapped redundant array of independent disks, a number of disks to be used in the mapped redundant array of independent disks.

According to another aspect of the present disclosure, there is provided an apparatus of maintaining reliability of a mapped redundant array of independent disks, comprising: a first probability determining module configured to determine a first data loss probability, the first data loss probability indicating reliability of a traditional redundant array of independent disks; a second probability determining module configured to determine a second data loss probability, the second data loss probability indicating reliability of the mapped redundant array of independent disks; and a condition determining module configured to determine, based on the first and second data loss probabilities, a condition for maintaining the reliability of the mapped redundant array of independent disks.

In some embodiments, the first probability determining module is further configured to: determine a first relationship between a first probability for a single disk failure at any time and the number of disks in the traditional redundant array of independent disks; determine a second relationship between a second probability for a single disk failure within a predetermined time interval and a length of the predetermined time interval; and determine the first data loss probability based on the first and second relationships.

In some embodiments, the first relationship indicates that the first probability for a single disk failure at any time is substantially proportional to the number of disks in the traditional redundant array of independent disks.

In some embodiments, the second relationship indicates that the second probability for a single disk failure within the predetermined time interval is substantially proportional to the length of the predetermined time interval.

In some embodiments, the second probability determining module is further configured to: determine the second data loss probability based on the first and second relationships.

In some embodiments, the condition determining module is further configured to: determine a third relationship between a first time for rebuilding the traditional redundant array of independent disks and a second time for rebuilding the mapped redundant array of independent disks, such that the second data loss probability does not exceed the first data loss probability.

In some embodiments, the condition determining module is further configured to: determine, based on the third relationship, a desired rate for rebuilding the mapped redundant array of independent disk.

In some embodiments, the condition determining module is further configured to: determine, based on the desired rate and an actual rate for rebuilding the mapped redundant array of independent disks, a number of disks to be used in the mapped redundant array of independent disks.

According to a further aspect of the present disclosure, there is provided a computer program product of maintaining reliability of a mapped redundant array of independent disks, the computer program product being tangibly stored on a non-transient computer readable medium and comprising machine-executable instructions that, when being executed, cause the machine to execute any step of the method.

Compared with the prior art, embodiments of the present disclosure can effectively predict the reliability of a mapped RAID through comparison with a traditional RAID, so as to be capable of determining a reliability relationship between the traditional RAID and the mapped RAID. In this way, the reliability of the traditional RAID will not be degraded when being expanded into the mapped RAID.

BRIEF DESCRIPTION OF THE DRAWINGS

Through the following detailed description with reference to the accompanying drawings, the above and other objectives, features, and advantages of example embodiments of the present disclosure will become more apparent. Several example embodiments of the present disclosure will be illustrated by way of example but not limitation in the drawings in which.

In respective drawings, same or corresponding reference numerals represent the same or corresponding parts.

DETAILED DESCRIPTION OF EMBODIMENTS

Figure 1:
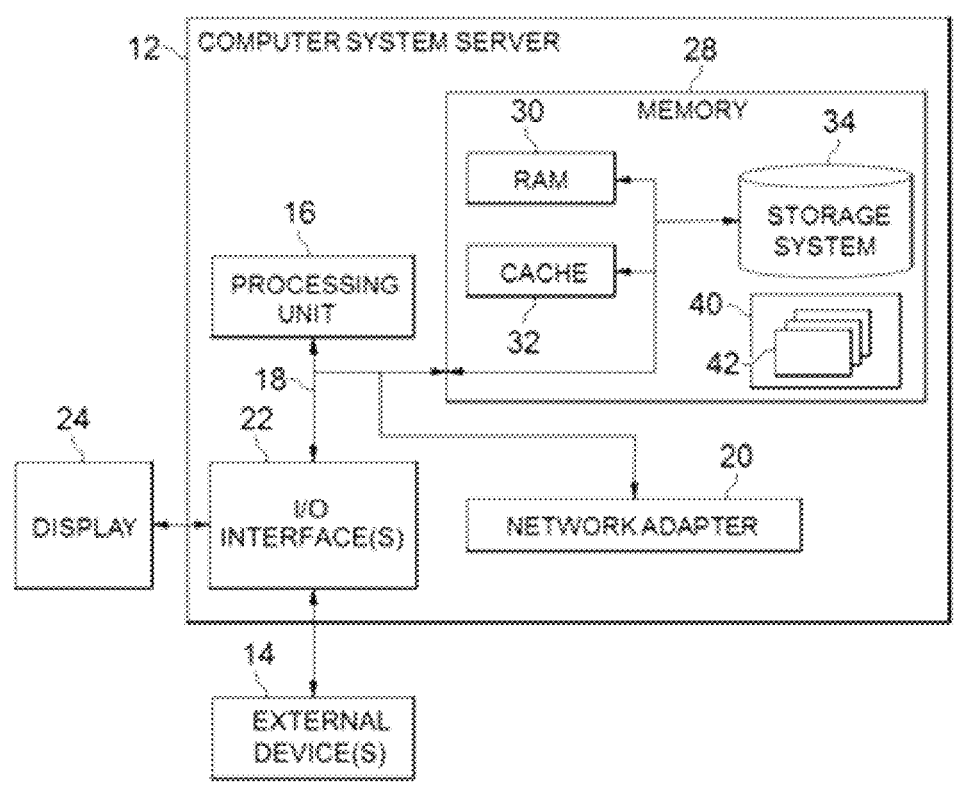
FIG. 1 is a block diagram illustrating an exemplary computer system/server 12 adapted to implement embodiments of the present disclosure.

Principles of example embodiments disclosed herein will now be described with reference to various example embodiments illustrated in the drawings. It should be appreciated that description of those embodiments is merely to enable those skilled in the art to better understand and further implement example embodiments disclosed herein and is not intended for limiting the scope disclosed herein in any manner.

FIG. 1 shows a block diagram of an exemplary computer system/server 12 adapted to implement the embodiments of the present disclosure. The computer system/server 12 as shown in FIG. 1 is only an example, which should not bring any limitation to the functions and scope of use of the embodiments of the present disclosure.

As shown in FIG. 1, the computer system/server 12 is embodied in a manner of a general computing device. Components of the computer system/server 12 may include, but not limited to: one or more processors or processing units 16, a system memory 28, a bus 18 for connecting different system components (including the system memory 28 and the processing unit 16).

The bus 18 indicates one or more of several bus structures, including a memory bur or a memory controller, a peripheral bus, an accelerated graphics port, a processor, or a local area bus using any bus structure in a variety of bus structures. For example, these hierarchical structures include, but not limited to, an Industry Standard Architecture (ISA) bus, a Micro Channel Architecture (MCA) bus, an enhanced ISA bus, a Video Electronics Standards Association (VESA) local area bus, and a Peripheral Component Interconnect (PCI) bus.

The computer system/server 12 typically comprises a plurality of computer system readable mediums. These mediums may be any available medium that can be accessed by the computer system/server 12, including volatile and non-volatile mediums, mobile and immobile mediums.

The system memory 28 may comprise a computer system readable medium in a form of a volatile memory, e.g., a random access memory (RAM) 30 and/or a cache memory 32. The computer system/server 12 may further comprise other mobile/immobile, volatile/non-volatile computer system storage medium. Only as an example, the memory system 34 may be used for reading/writing immobile and non-volatile magnetic mediums (not shown in FIG. 1, generally referred to as "hard-disk driver"). Although not shown in FIG. 1, a disk driver for reading/writing a mobile non-volatile disk (e.g., "floppy disk") and an optical disk driver for reading/writing a mobile non-volatile optical disk (e.g., CD-ROM, DVD-ROM or other optical medium) may be provided. In these cases, each driver may be connected to the bus 18 via one or more data medium interfaces. The memory 28 may include at least one program product that has a set of program modules (e.g., at least one). These program modules are configured to perform functions of various embodiments of the present disclosure.

A program/utility tool 40 having a set of program modules 42 (at least one) may be stored in for example the memory 28. This program module 42 includes, but not limited to, an operating system, one or more applications, other program modules, and program data. Each or certain combination in these examples likely includes implementation of a network environment. The program module 42 generally performs the functions and/or methods in the embodiments as described in the present disclosure.

The computer system/server 12 may also communicate with one or more external devices 14 (e.g., a keyboard, a pointing device, a display 24, etc.), and may also communicate with one or devices that cause the user to interact with the computer system/server 12, and/or communicate with any device (e.g., a network card, a modem, etc.) that causes the computer system/server 12 to communicate with one or more other computing devices. This communication may be carried out through an input/output (I/O) interface 22. Moreover, the computer system/server 12 may also communicate with one or more networks (e.g., a local area network (LAN), a wide area network (WAN) and/or a public network, e.g., Internet) via a network adaptor 20. As shown in the figure, the network adaptor 20 communicates with other modules of the computer system/server 12 via the bus 18. It should be understood that although not shown in the figure, other hardware and/or software modules may be used in conjunction with the computer system/server 12, including, but not limited to: microcode, device driver, redundancy processing unit, external disk drive array, RAID system, magnetic tape driver, and data backup storage system, etc. 1750.

At the ease of depiction, embodiments of the present disclosure will be illustrated in detail with an example of a RAID 5 having 4 data blocks and 1 parity block (4D+1P). However, it should be understood that the principle and method of the embodiments of the present disclosure may be applicable to any RAID with any level or layout, not limited to the examples provided hereinafter. Moreover, the protection scope of the present disclosure is not limited in this aspect.

Figure 2:
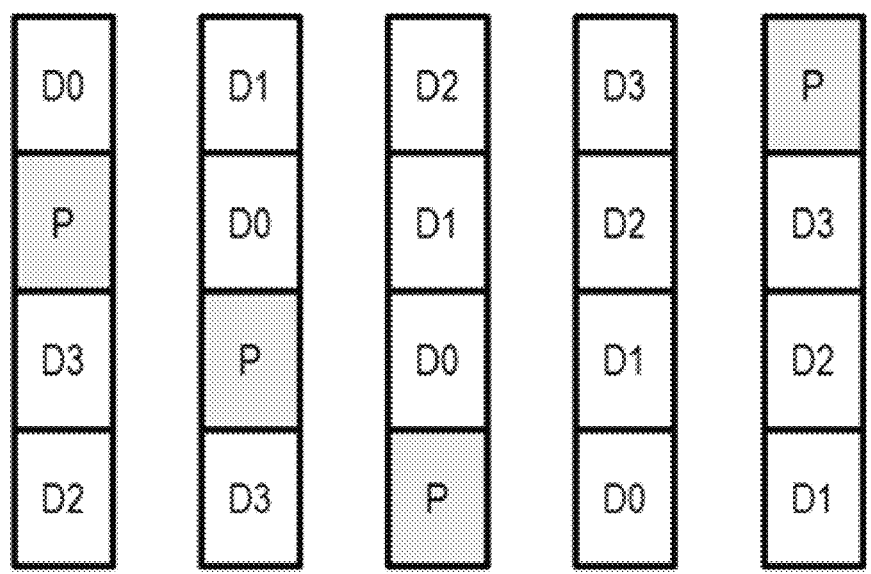
FIG. 2 is a schematic diagram of an exemplary layout of a traditional RAID 5 having 4 data blocks and 1 parity block.
Figure 2:
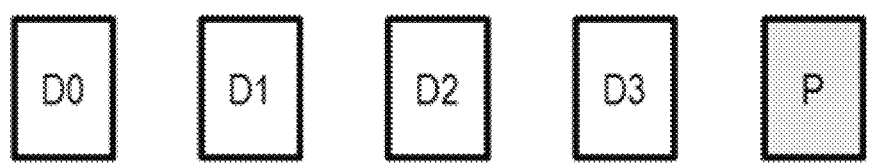
Figure 3:
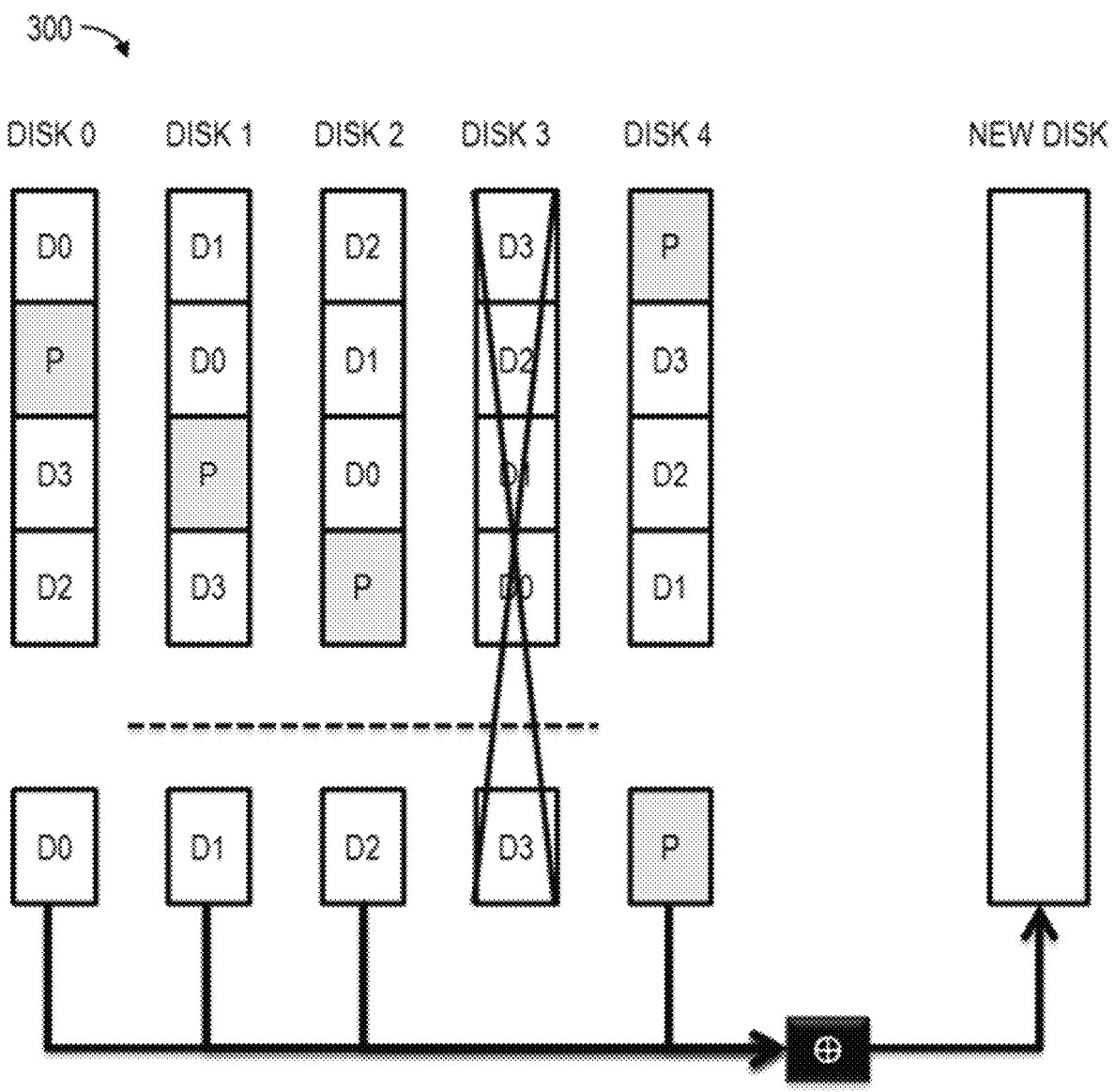
FIG. 3 is a schematic diagram of re-building the traditional RAID 5.

For example, FIG. 2 is a schematic diagram of an exemplary layout of a traditional RAID5 with 4D+1P. The RAID5 comprises block-level stripes having distributed parity information that may be distributed across a plurality of disks. As illustrated in FIG. 2, the RAID5 uses 5 disks in total, which are disk 0, disk 1, disk 2, disk 3, and disk 4, respectively. Each of the stripes may comprise 5 blocks consisting of 4 data blocks (i.e., D0-D4) and 1 parity block (i.e., P). When a single disk fails, subsequent readings can be calculated through distributed parity information, such that data would not be lost. Meanwhile, a hot spare disk will be selected to replace the failed disk. Moreover, all data on the failed disk will be rebuilt and written onto the hot spare disk. FIG. 3 illustrates a schematic diagram of building the traditional RAID5 as shown in FIG. 2. As illustrated in FIG. 3, upon failure of disk 3, a new disk (i.e., a hot spare disk) may be selected to replace the disk 3, and all data on the disk 3 will be rebuilt and written onto the new disk.

However, with emergency of new technologies (e.g., a shingled media disk), disk capacity increases year by year and the rebuilding time also increases accordingly. If the rebuilding time of the disk cannot be lowered, an increase risk of double disk failure will occur, which will lead to data loss. The rebuilding time of RAID 5 is subject to a write bandwidth of the hot spare disk, which has become a bottleneck for traditional RAID technologies.

The problem above may be solved by extending the traditional RAID into a mapped RAID. The mapped RAID may consist of more disks than a traditional RAID, and each disk may be regarded as a set of continuous, non-overlapping, and fixedly sized disk extents.

Figure 4:
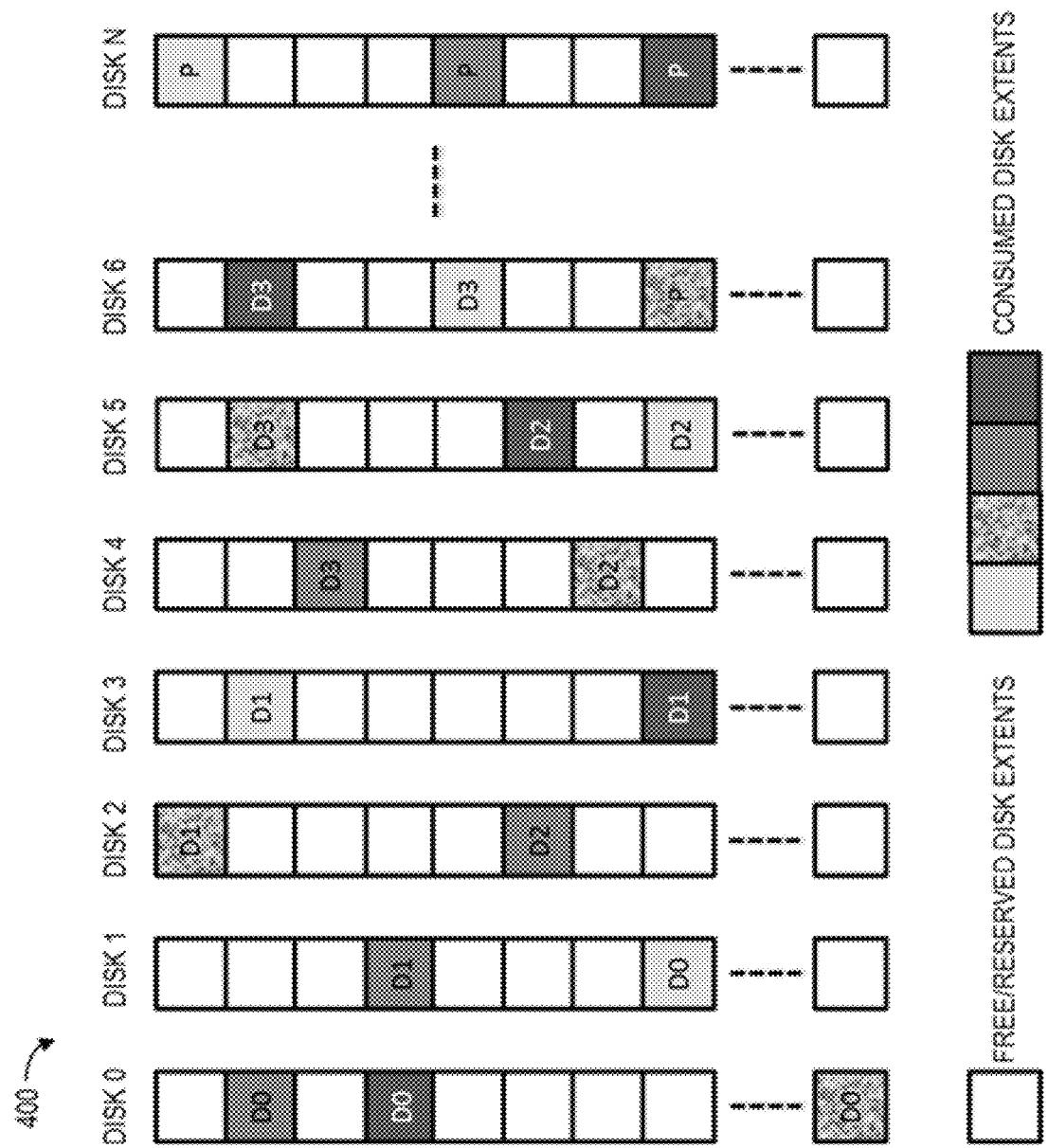
FIG. 4 is a schematic diagram of an exemplary layout of a mapped RAID.
Figure 5:
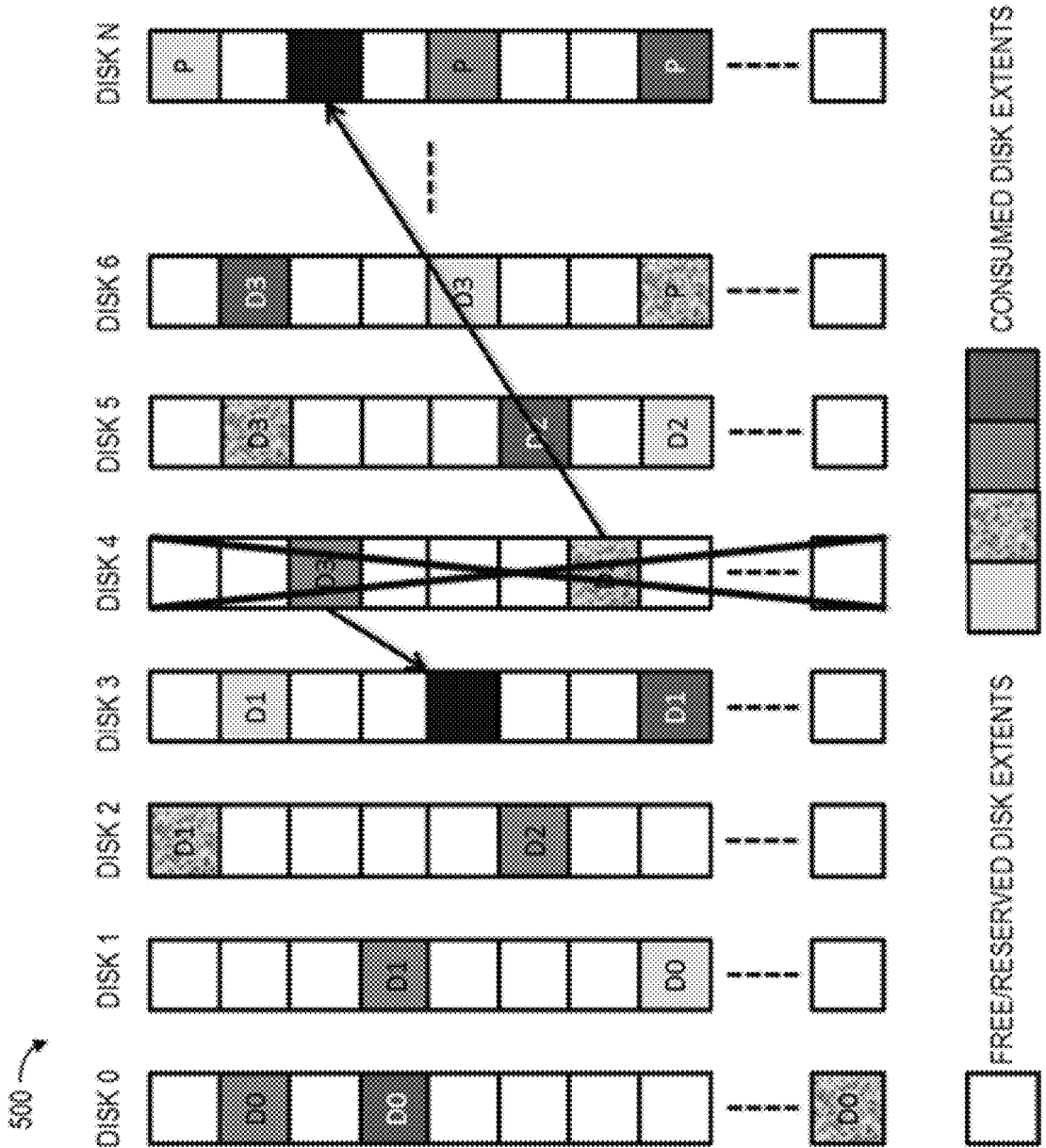
FIG. 5 is a schematic diagram of rebuilding the mapped RAID.

For example, FIG. 4 shows a schematic diagram of an exemplary layout of a mapped RAID, which schematically shows an example of creating a 4D+1P RAID5 over N disks, where N is greater than 5. As illustrated in FIG. 4, when creating a RAID stripe, 5 disk extents may be randomly selected from 5 different disks. Therefore, data and parity information will be finally distributed cross all of the disks. In addition, some disk extents may be reserved on each of the disks as hot spare disk extents, not like a traditional RAID5 in which a whole disk is reserved as a hot spare disk. Upon failure of one disk, for each of the disk extents on the failed disk, one disk extent on another disk may be randomly selected as a replacement. For example, FIG. 5 schematically illustrates a diagram of rebuilding the mapped RAID of FIG. 4. As illustrated in FIG. 5, upon failure of disk 4, for each of the disk extents (i.e., the disk extent where D3 is located and the disk extent where D2 is located) on the disk 4, a disk extent on another disk may be randomly selected as a replacement (e.g., the data in D3 is rebuilt and written to one spare disk extent of disk 3, while the data in D2 is rebuilt and written to one spare disk extent of disk N). The only restriction in selecting a disk extent is that each RAID stripe should be always required to straddle 5 different disks. Therefore, with this technology, all of the disks will be involved in the rebuilding process. Because there is no single hot spare disk and the rebuilding and writing of a plurality of disk extents can be executed in parallel, the overall rebuilding time will be reduced.

However, the approach of extending a traditional RAID to a mapped RAID by increasing the number of disks possibly affects its reliability (e.g., increasing the probability of data loss). In order to solve this problem, the embodiments of the present disclosure provide a technical solution for maintaining the reliability of the mapped RAID.

Figure 6:
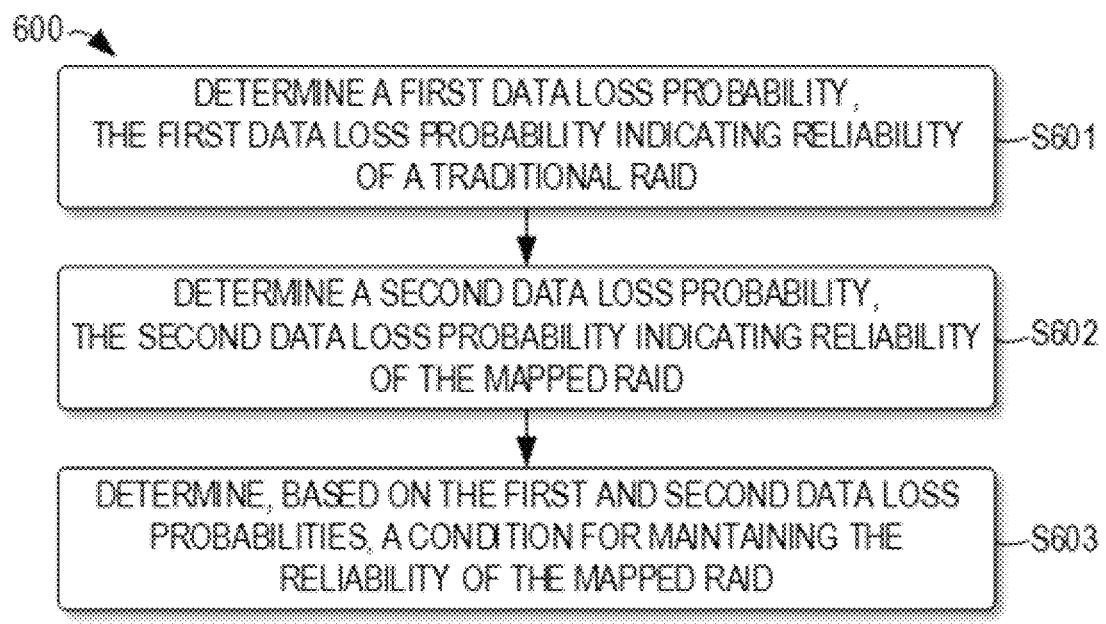
FIG. 6 is a flow diagram of a method 600 for maintaining reliability of a mapped RAID according to embodiments of the present disclosure.

FIG. 6 is a flow diagram of a method 600 for maintaining reliability of a mapped RAID according to embodiments of the present disclosure. For example, the method 600 may be executed by a computer system/server 12 illustrated in FIG. 1. The method 600 may comprise steps S601 to S603.

At S601, a first data loss probability is determined. The first data loss probability indicates reliability of a traditional RAID. Hereinafter, the determining of a data loss probability will be described in detail with a 4D+1P RAID5 as an example.

Figure 7:
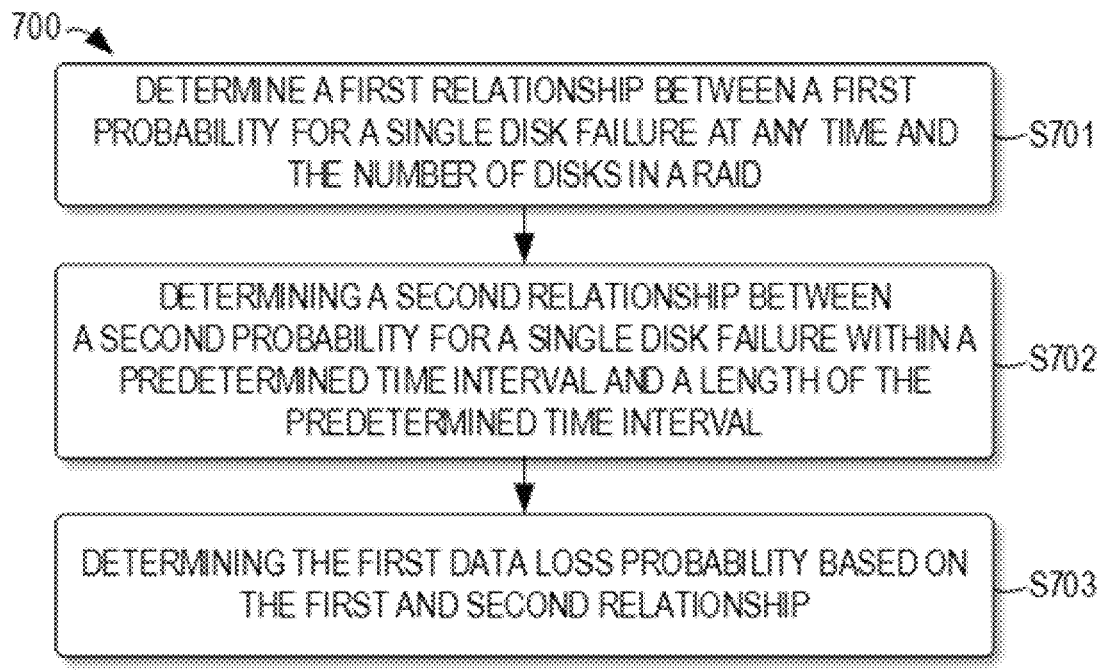
FIG. 7 is a flow diagram of a method 700 for determining a data loss probability of a RAID according to embodiments of the present disclosure.

For example, FIG. 7 is a flow diagram of a method 700 for determining a data loss probability of a RAID according to embodiments of the present disclosure. The method 700 may also be executed by the computer system/server 12 as shown in FIG. 1. The method 700 may comprise steps S701 to S703.

At S701, a first relationship between a first probability for a single disk failure at any time and the number of disks in a RAID is determined. For example, suppose P is the first probability for a single disk failure at any time, and P(N) is a probability for a single disk failure at any time over N disks. Therefore, the following may be derived:

$$P(1) = P;$$
$$P(2) = 2 \cdot P(1-P) = 2P - 2P^2;$$
$$P(3) = 3 \cdot P(1-P)(1-P) = 3P - 6P^2 + 3P^3;$$
$$\ldots$$
$$P(N) = N \cdot P \cdot (1-P)^{N-1}.$$

Considering that the mean time to failure (MTTF) for a commercial disk is as long as 5 years, P may be relatively small. Therefore, the high-order terms in above equations could be removed, and the following can be derived:

$$P(1) = P;$$
$$P(2) \approx 2P;$$
$$P(3) \approx 3P;$$
$$\ldots$$
$$P(N) \approx NP.$$

In other words, the first probability for a single disk failure at any time is approximately proportional to the number of disks in the RAID.

The method 700 proceeds to step S702, in which a second relationship between a second probability for a single disk failure within a predetermined time interval and a length of the predetermined time interval is determined. For example, the second relationship may be determined by common sense. Suppose variation of the disk failure probability with time follows a distribution function p(t) and the MTTF is about 5 years. Considering the predetermined time interval is usually in the order of days, the distribution function curve in the predetermined time interval may be approximately fit to a straight line, i.e., $p(t) \approx p_0$ within the predetermined time interval. The probabilities for a single disk failure within time intervals T and T' are denoted as P(T) and P(T') respectively, where T and T' start from the same time S. Therefore, $P(T)/P(T')=(p_0 \cdot T)/(p_0 \cdot T')=T/T'$. That is, the second probability for a single disk failure within the predetermined time interval is substantially proportional to the length of the predetermined time interval. In addition, the second relationship between a second probability for a single disk failure within a predetermined time interval and a length of the predetermined time interval may be determined in an arithmetic manner. Suppose variation of the disk failure probability with time follows an exponential distribution and suppose the probability density function PDF(t) $=\lambda e^{-\lambda t}$. Therefore, the continuous density function CDF(t) $=\int_0^t \lambda e^{-\lambda t} dt = 1 - e^{-\lambda t}$, where $\lambda$ denotes a rate parameter. Therefore, the probabilities for a single disk failure within time intervals T, 2T, . . . nT may be derived:

$$P(T) =$$
$$CDF(S+T) - CDF(S) = 1 - e^{-\lambda(S+T)} - (1 - e^{-\lambda S}) = e^{-\lambda S} - e^{-\lambda(S+T)};$$
$$P(2T) = CDF(S+2T) - CDF(S) =$$
$$1 - e^{-\lambda(S+2T)} - (1 - e^{-\lambda S}) = e^{-\lambda S} - e^{-\lambda(S+2T)};$$
$$P(3T) = CDF(S+3T) - CDF(S) =$$
$$1 - e^{-\lambda(S+3T)} - (1 - e^{-\lambda S}) = e^{-\lambda S} - e^{-\lambda(S+3T)};$$
$$\ldots$$
$$P(nT) =$$
$$CDF(S+nT) - CDF(S) = 1 - e^{-\lambda(S+nT)} - (1 - e^{-\lambda S}) = e^{-\lambda S} - e^{-\lambda(S+nT)}.$$

By comparing P(T) with P(2T), P(3T), . . . , P(nT) and letting $y=e^{-\lambda t}$, the following may be derived:

$$\frac{P(T)}{P(2T)} = \frac{e^{-\lambda S} - e^{-\lambda(S+T)}}{e^{-\lambda S} - e^{-\lambda(S+2T)}} = \frac{1 - e^{-\lambda T}}{1 - e^{-2\lambda T}} = \frac{1-y}{1-y^2} = \frac{1}{y+1}$$

$$\frac{P(T)}{P(3T)} = \frac{e^{-\lambda S} - e^{-\lambda(S+T)}}{e^{-\lambda S} - e^{-\lambda(S+3T)}} = \frac{1 - e^{-\lambda T}}{1 - e^{-3\lambda T}} = \frac{1-y}{1-y^3} = \frac{1}{y^2+y+1}$$

$$\ldots$$

$$\frac{P(T)}{P(nT)} = \frac{e^{-\lambda S} - e^{-\lambda(S+T)}}{e^{-\lambda S} - e^{-\lambda(S+nT)}} = \frac{1 - e^{-\lambda T}}{1 - e^{-n\lambda T}} = \frac{1-y}{1-y^n} = \frac{1}{y^{n-1} + \ldots + y + 1}$$

When the MTTF is 5 years and the time is in a unit of hours, $\lambda = 1/(5 \times 365 \times 24) \approx 2.28e^{-5}$, which is relatively small, i.e., $y = e^{-\lambda t} \approx 1$. Therefore, it may be derived that $$\frac{P(T)}{P(2T)} = \frac{1}{2}, \frac{P(T)}{P(3T)} = \frac{1}{3}, \ldots, \frac{P(T)}{P(nT)} = \frac{1}{n}.$$

That is, the probability for a single disk failure within a predetermined time interval is substantially proportional to the length of the predetermined time interval.

The method 700 proceeds to step S703 to determine a data loss probability of the RAID based on the first and second relationships. Taking the traditional 4D+1P RAID5 as an example, suppose there is a disk failure at a time point S such that a rebuilding process is triggered and suppose a failure probability for each of the disks at the time point S is P. Based on the first relationship, i.e., the probability for a single disk failure at any time is substantially proportional to the number of disks in the RAID, the failure probability of one of the 5 disks at the time point S is 5P. Suppose the rebuilding time of the traditional RAID is T. If another disk within a rebuilding time T also fails, the data will be lost. Suppose the failure probability for each of the disks within the time T is P(T). Because there remains 4 disks except the already failed one, the failure probability for another disk within the time T is 4P(T). In this way, the first data loss probability of the traditional 4D+1P RAID5 may be derived as P1=5·P·4P(T)=20P·P(T).

Return to FIG. 6. The method 600 proceeds to step S602 to determine a second data loss probability, which indicates the reliability of the mapped RAID. In some embodiments of the present disclosure, the second data loss probability may be determined by the method 700 depicted above with reference to FIG. 7. For example, through step S701 of the method 700, the first relationship between the first probability for a single disk failure at any time and the number of disks in the RAID has been determined. That is, the first probability for a single disk failure at any time is substantially proportional to the number of disks in the RAID. Through step S702 of the method 700, the second relationship between the second probability for a single disk failure within the predetermined time interval and the length of the predetermined time interval has been determined, i.e., the second probability for a single disk failure within the predetermined time interval is proportional to the length of the predetermined time interval. Therefore, through step S703 of the method 700, the data loss probability of the mapped RAID may be determined based on the first and second relationships. For the mapped RAID, suppose a disk failure occurs at the time point S such that a rebuilding process is triggered, and suppose a failure probability for each of the disks at the time point S is P. Based on the first relationship, the failure probability for one of N disks at the time point S may be derived as NP. Suppose the rebuilding time of the mapped RAID is T'. If another disk also fails during the rebuilding time T', data will be lost. Based on the second relationship, it may be derived that the failure probability for another disk within the time T' is $(N-1) \cdot (T'/T) \cdot P(T)$. In this way, the second data loss probability $P_2$ of the 4D+1P mapped RAID over N disks can be determined. That is, $$P_2 = N \cdot P \cdot (N-1) \cdot (T'/T) \cdot P(T) = \frac{N \cdot (N-1) \cdot T'}{T} \cdot P \cdot P(T).$$

The method 600 proceeds to step S603 to determine a condition for maintaining reliability of the mapped RAID based on the first and second data loss probabilities.

In some embodiments of the present disclosure, step S603 may comprise determining a third relationship between the rebuilding time of the traditional RAID and the rebuilding time of the mapped RAID, such that the second data loss probability is not higher than the first data loss probability. For example, through the steps S602 and S603, the first data loss probability $P_1$ of the traditional RAID and the second data loss probability $P_2$ of the mapped RAID have already been determined, e.g., $$P_1 = 20P \cdot P(T) \text{ and } P_2 = \frac{N \cdot (N-1) \cdot T'}{T} \cdot P \cdot P(T)$$

In order to make P2≤P1 (i.e., causing the reliability of the mapped RAID to be not lower than the traditional RAID), it may be derived that $$20P \cdot P(T) \le \frac{N \cdot (N-1) \cdot T'}{T} \cdot P \cdot P(T), \text{ i.e., } \frac{T}{T'} \ge \frac{N(N-1)}{20}.$$

Therefore, a third relationship $$\frac{T}{T'} \ge \frac{N(N-1)}{20}$$

between the rebuilding time T of the traditional RAID and the rebuilding time T' of the mapped RAID needs to be satisfied. In other words, if it is desired to maintain reliability identical to the traditional RAID, the rebuilding rate of the extended mapped RAID needs to be promoted to $$\frac{N(N-1)}{20}$$

times of the rebuilding rate of the traditional RAID, where N denotes the number of disks used by the mapped RAID.

In some embodiments of the present disclosure, step S603 may further comprise determining a desired rebuilding rate of the mapped RAID based on the third relationship (i.e., the third relationship $$\frac{T}{T'} \ge \frac{N(N-1)}{20}$$

between the rebuilding time T of the traditional RAID and the rebuilding time T' of the mapped RAID needs to be satisfied, such that the reliability of the mapped RAID is not lower than the reliability of the traditional RAID). For example, Table 1 illustrates the lower limit of the rebuilding rate of the mapped RAID to which the traditional 4D+1P RAID5 is extended by increasing the number of disks (e.g., as shown in Table 1, the number of disks increases from 6 to 20), in the case of the rebuilding rate of the traditional RAID5 is 35 MB/s (e.g., derived through experiments), in order to maintain the reliability of the mapped RAID.

TABLE 1

Desired Rebuilding Rates of the Mapped RAID

| Number of disks | Rebuilding rate scale | Lower limit of the rebuilding rate (MB/S) |
|---|---|---|
| 20 | 19.000000 | 665.00 |
| 19 | 17.100000 | 598.50 |
| 18 | 15.300000 | 535.50 |
| 17 | 13.600000 | 476.00 |
| 16 | 12.000000 | 420.00 |
| 15 | 10.500000 | 367.50 |
| 14 | 9.100000 | 318.50 |
| 13 | 7.800000 | 273.00 |
| 12 | 6.600000 | 231.00 |
| 11 | 5.500000 | 192.50 |
| 10 | 4.500000 | 157.50 |
| 9 | 3.600000 | 126.00 |
| 8 | 2.800000 | 98.00 |
| 7 | 2.100000 | 73.50 |
| 6 | 1.500000 | 52.50 |

In practice, the desired rebuilding rate possibly may not be achieved. Therefore, in some embodiments of the present disclosure, step S603 may also comprise determining, based on the desired rate and the actual rate for rebuilding the mapped RAID, the number of disks to be used by the mapped RAID. For example, supposing the rebuilding rate of the traditional 4D+1P RAID5 is 35 MB/s, the test results of the actual rates for rebuilding the mapped RAID derived through experiments and measurements in a specific configuration are shown in Table 2.

TABLE 2

Actual Rebuild Rates of the Mapped RAID

| Concurrently rebuilding 10 RAID stripes (10 threads) | | Concurrently rebuilding 15 RAID stripes (15 threads) | |
|---|---|---|---|
| Number of disks | Rebuilding rate (MB/S) | Number of disks | Rebuilding rate (MB/S) |
| 20 | 269.4736842 | 20 | 359.1890185 |
| 19 | 253.3211291 | 19 | 338.3185392 |
| 18 | 255.0054786 | 18 | 335.0639152 |
| 17 | 258.3640309 | 17 | 289.6582937 |
| 16 | 255.3297594 | 16 | 249.9186463 |
| 15 | 245.4458293 | 15 | 267.2652294 |
| 14 | 226.7744436 | 14 | 251.728998 |
| 13 | 218.7239678 | 13 | 235.930204 |
| 12 | 215.1441298 | 12 | 239.062427 |
| 11 | 205.6720495 | 11 | 207.0276172 |
| 10 | 187.302226 | 10 | 201.4373393 |
| 9 | 175.7487342 | 9 | 194.1330367 |
| 8 | 171.9043782 | 8 | 169.0122248 |
| 7 | 156.1689797 | 7 | 156.6084483 |
| 6 | 147.786806 | 6 | 145.0808524 |

By comparing Table 1 and Table 2, it may be found that if the number of disks in the mapped RAID is greater than 12, the reliability of the mapped RAID in such a specific configuration cannot be maintained. Therefore, in order to ensure that the reliability of the mapped RAID in such a specific configuration is not lower than the reliability of the traditional RAID5, at most 12 disks may be used by the mapped RAID.

Figure 8:
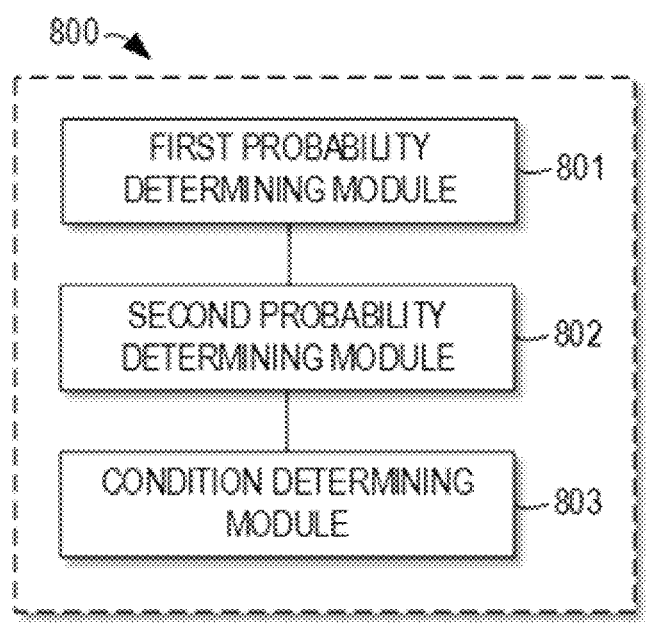
FIG. 8 is a block diagram of an apparatus 800 for maintaining reliability of a mapped RAID according to embodiments of the present disclosure.

FIG. 8 is a block diagram of an apparatus 800 for maintaining reliability of a mapped RAID according to embodiments of the present disclosure. The apparatus 800 may comprise: a first probability determining module 801 configured to determine a first data loss probability, the first data loss probability indicating reliability of a traditional RAID. The apparatus 800 may also comprise a second probability determining module 802 configured to determine a second data loss probability, the second data loss probability indicating reliability of the mapped RAID. Additionally, the apparatus 800 may also comprise a condition determining module 803 configured to determine, based on the first and second data loss probabilities, a condition for maintaining the reliability of the mapped RAID.

In some embodiments, the first probability determining module 801 may also be configured to: determine a first relationship between a first probability for a single disk failure at any time and the number of disks in the RAID; determine a second relationship between a second probability for a single disk failure within a predetermined time interval and a length of the predetermined time interval; and determine the first data loss probability based on the first and second relationships. The first relationship may indicate that the first probability for a single disk failure at any time is substantially proportional to the number of disks in the RAID; and the second relationship may indicate that the second probability for a single disk failure within the predetermined time interval is substantially proportional to the length of the predetermined time interval.

In some embodiments, the second probability determining module 802 may be further configured to: determine the second data loss probability based on the first and second relationships.

In some embodiments, the condition determining module 802 may be further configured to: determine a third relationship between a first time for rebuilding the traditional RAID and a second time for rebuilding the mapped RAID, such that the second data loss probability does not exceed the first data loss probability.

In some embodiments, the condition determining module 803 may be further configured to: determine a desired rate for rebuilding the mapped RAID based on the third relationship.

In some embodiments, the condition determining module 803 may be also configured to: determine, based on the desired rate and an actual rate for rebuilding the mapped RAID, a number of disks to be used in the mapped RAID.

For the sake of clarity, FIG. 8 does not show some optional modules of the apparatus 800. However, it should be understood that respective features described above with reference to FIGS. 1-7 are also suitable for the apparatus 800. Moreover, respective modules in the apparatus 800 may be hardware modules or software modules. For example, in some embodiments, the apparatus 800 may be implemented partially or fully with software and/or firmware, e.g., implemented as a computer program product embodied on a computer readable medium. Alternatively or additionally, the apparatus 800 may be implemented partially or fully based on hardware, e.g., implemented as an integrated circuit (IC), an application-specific integrated circuit (ASIC), a system on chip (SOC), a field programmable gate array (FPGA), etc. The scope of the present disclosure is not limited in this aspect.

In view of the above, the embodiments of the present disclosure provide a method and an apparatus for maintaining reliability of a mapped RAID. Compared with the prior art, embodiments of the present disclosure can effectively predict the reliability of a mapped RAID through comparison with a traditional RAID, so as to be capable of determining a reliability relationship between the traditional RAID and the mapped RAID. In this way, the reliability of the traditional RAID will not be degraded when being expanded into the mapped RAID.

The embodiments of the present disclosure may be a method, an apparatus and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams illustrate the architecture, functionality, and operation of possible implementations of systems, methods and computer program products according to various embodiments of the present invention. In this regard, each block in the flowchart or block diagrams may represent a module, snippet, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of maintaining reliability of a mapped redundant array of independent disks, comprising:
determining a first data loss probability, the first data loss probability indicating reliability of a traditional redundant array of independent disks;
determining a second data loss probability, the second data loss probability indicating reliability of the mapped redundant array of independent disks, wherein each disk of a plurality of disks is divided into a plurality of disk extents, wherein the mapped redundant array of independent disks includes at least a portion of the plurality of disk extents from across the plurality of disks; and
determining, based on the first and second data loss probabilities, a condition for maintaining the reliability of the mapped redundant array of independent disks, wherein determining the condition for maintaining the reliability of the mapped redundant array of independent disks comprises:
determining a first relationship between a first time for rebuilding the traditional redundant array of independent disks and a second time for rebuilding the mapped redundant array of independent disks, such that the second data loss probability does not exceed the first data loss probability;

determining, based on the first relationship, a desired rate for rebuilding the mapped redundant array of independent disks;

determining, based on the desired rate and an actual rate for rebuilding the mapped redundant array of independent disks, a number of disks to be used in the mapped redundant array of independent disks; and rebuilding the mapped redundant array of independent disks based on the number of disks to be used in the mapped redundant array of independent disks.

2. The method of claim 1, wherein determining the first data loss probability comprises:

determining a second relationship between a first probability for a single disk failure at any time and the number of disks in the traditional redundant array of independent disks;

determining a third relationship between a second probability for a single disk failure within a predetermined time interval and a length of the predetermined time interval; and determining the first data loss probability based on the second and third relationships.

3. The method of claim 2, wherein the second relationship indicates that the first probability for a single disk failure at any time is substantially proportional to the number of disks in the traditional redundant array of independent disks.

4. The method of claim 2, wherein the third relationship indicates that the second probability for a single disk failure within the predetermined time interval is substantially proportional to the length of the predetermined time interval.

5. The method of claim 2, wherein determining the second data loss probability comprises:

determining the second data loss probability based on the second and third relationships.

6. An apparatus of maintaining reliability of a mapped redundant array of independent disks, comprising:

a first probability determining module configured to determine a first data loss probability, the first data loss probability indicating reliability of a traditional redundant array of independent disks;

a second probability determining module configured to determine a second data loss probability, the second data loss probability indicating reliability of the mapped redundant array of independent disks, wherein each disk of a plurality of disks is divided into a plurality of disk extents, wherein the mapped redundant array of independent disks includes at least a portion of the plurality of disk extents from across the plurality of disks; and a condition determining module configured to determine, based on the first and second data loss probabilities, a condition for maintaining the reliability of the mapped redundant array of independent disks, wherein the condition determining module is further configured to:

determine a first relationship between a first time for rebuilding the traditional redundant array of independent disks and a second time for rebuilding the mapped redundant array of independent disks, such that the second data loss probability does not exceed the first data loss probability;

determining, based on the first relationship, a desired rate for rebuilding the mapped redundant array of independent disks;

determining, based on the desired rate and an actual rate for rebuilding the mapped redundant array of independent disks, a number of disks to be used in the mapped redundant array of independent disks; and rebuilding the mapped redundant array of independent disks based on the number of disks to be used in the mapped redundant array of independent disks.

7. The apparatus of claim 6, wherein the first probability determining module is further configured to:

determine a second relationship between a first probability for a single disk failure at any time and the number of disks in the traditional redundant array of independent disks;

determine a third relationship between a second probability for a single disk failure within a predetermined time interval and a length of the predetermined time interval; and determine the first data loss probability based on the second and third relationships.

8. The apparatus of claim 7, wherein the second relationship indicates that the first probability for a single disk failure at any time is substantially proportional to the number of disks in the traditional redundant array of independent disks.

9. The apparatus of claim 7, wherein the third relationship indicates that the second probability for a single disk failure within the predetermined time interval is substantially proportional to the length of the predetermined time interval.

10. The apparatus of claim 7, wherein the second probability determining module is further configured to:

determine the second data loss probability based on the second and third relationships.

11. A computer program product for maintaining reliability of a mapped redundant array of independent disks, the computer program product comprising:

a non-transitory computer readable medium encoded with computer-executable code, the code configured for the execution of:

determining a first data loss probability, the first data loss probability indicating reliability of a traditional redundant array of independent disks;

determining a second data loss probability, the second data loss probability indicating reliability of the mapped redundant array of independent disks, wherein each disk of a plurality of disks is divided into a plurality of disk extents, wherein the mapped redundant array of independent disks includes at least a portion of the plurality of disk extents from across the plurality of disks; and determining, based on the first and second data loss probabilities, a condition for maintaining the reliability of the mapped redundant array of independent disks, wherein determining the condition for maintaining the reliability of the mapped redundant array of independent disks comprises:

determining a first relationship between a first time for rebuilding the traditional redundant array of independent disks and a second time for rebuilding the mapped redundant array of independent disks, such that the second data loss probability does not exceed the first data loss probability;

determining, based on the first relationship, a desired rate for rebuilding the mapped redundant array of independent disks;

determining, based on the desired rate and an actual rate for rebuilding the mapped redundant array of independent disks, a number of disks to be used in the mapped redundant array of independent disks; and rebuilding the mapped redundant array of independent disks based on the number of disks to be used in the mapped redundant array of independent disks.

12. The computer program product of claim 11, wherein determining the first data loss probability comprises:

determining a second relationship between a first probability for a single disk failure at any time and the number of disks in the traditional redundant array of independent disks;

determining a third relationship between a second probability for a single disk failure within a predetermined time interval and a length of the predetermined time interval; and determining the first data loss probability based on the second and third relationships.

13. The computer program product of claim 12, wherein the second relationship indicates that the first probability for a single disk failure at any time is substantially proportional to the number of disks in the traditional redundant array of independent disks.

14. The computer program product of claim 12, wherein the third relationship indicates that the second probability for a single disk failure within the predetermined time interval is substantially proportional to the length of the predetermined time interval.

* * * * *